US006738570B2

(12) United States Patent
Shinohara et al.

(10) Patent No.: US 6,738,570 B2
(45) Date of Patent: May 18, 2004

(54) LENS APPARATUS HAVING VAPOR-RESISTANT VENTILATION AND OPTICAL INSTRUMENT USING LENS APPARATUS

(75) Inventors: Mitsuru Shinohara, Kanagawa (JP); Jun Sugita, Tochigi (JP); Shigeki Satoh, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/331,511

(22) Filed: Dec. 31, 2002

(65) Prior Publication Data

US 2003/0128973 A1 Jul. 10, 2003

(30) Foreign Application Priority Data

Jan. 4, 2002 (JP) ........................ 2002-000092
Aug. 29, 2002 (JP) ........................ 2002-250723

(51) Int. Cl.[7] .......................... G03B 17/08; G03B 17/00
(52) U.S. Cl. .................. 396/25; 396/29; 396/71; 396/530; 396/531; 359/508; 359/513
(58) Field of Search .................. 396/25, 29, 448, 396/529, 530, 531, 71, 72, 73, 74, 75, 532, 533, 534, 544; 359/507, 508, 513, 511, 512

(56) References Cited

U.S. PATENT DOCUMENTS

| | | | |
|---|---|---|---|
| 4,931,816 A | 6/1990 | Kamo et al. | 354/64 |
| 5,070,348 A | * 12/1991 | Hayakawa et al. | 396/26 |
| 5,305,145 A | * 4/1994 | Tanaka | 359/513 |
| 6,327,433 B1 | 12/2001 | Ishikawa et al. | 396/55 |

FOREIGN PATENT DOCUMENTS

| | | |
|---|---|---|
| JP | 01-302241 | 12/1989 |
| JP | 9-197527 | 7/1997 |
| JP | 2909906 | 4/1999 |
| JP | 11-190881 | 7/1999 |

* cited by examiner

Primary Examiner—Russell Adams
Assistant Examiner—Rochelle Blackman
(74) Attorney, Agent, or Firm—Fitzpatrick, Cella, Harper & Scinto

(57) ABSTRACT

A lens apparatus or optical instrument having a lens apparatus including a holding member that holds and moves a lens or a lens group in an optical axis direction, the holding member having a vent providing ventilation between the interior and the exterior of the lens apparatus, a water-repellent microporous member that covers the vent, and an appearance member disposed on the holding member, with a clearance provided between the appearance member and the holding member, so as to shield the water-repellent microporous member.

12 Claims, 15 Drawing Sheets

LENS APPARATUS HAVING VAPOR-RESISTANT VENTILATION AND OPTICAL INSTRUMENT USING LENS APPARATUS

BACKGROUND OF THE INVENTION

1. Field of the Invention

The present invention relates to a lens apparatus and, more specifically, to a lens apparatus having vapor-resistant ventilation and an optical instrument using such a lens apparatus.

2. Description of the Related Art

Heretofore, in lens-barrels (lens apparatuses) having a zoom mechanism, there have been many cases wherein when a lens-holding frame holding a lens or a lens group arranged on the utmost object side moves (changes the overall length of the lens barrel) during a zooming operation, an air volume within the lens-barrel changes. When an internal volume of the lens-barrel changes, by ventilation through a clearance of the lens-barrel, air comes in and out so that the pressure in the lens-barrel is maintained substantially equal with the external pressure, enabling the lens-holding frame to be smoothly moved.

On the other hand, in providing vapor-resistant performance in such a lens-barrel, air cannot come in and out because the lens-barrel is hermetically sealed relative to the exterior environment. Several techniques are disclosed in Japanese Patent Publication No.2909906, Japanese Patent Laid-Open No.9-197527, and Japanese Patent Laid-Open No.11-190881, in which an opening is formed in part of a camera body (grip or side face), and in an opening formed in a cylindrical portion of a lens-barrel, a water-repellent microporous member such as Gore-Tex (registered trademark) and Micro-Tex (registered trademark) that allows air to pass through the opening while prohibit a water droplet to pass therethrough is provided.

To a camera body in an interchangeable lens system, however, interchangeable zoom lens-barrels having a plurality of focal-length ranges typically are attachable thereto. Accordingly, in a case where a vent for adjusting internal pressure is provided in the camera body, the vent has to correspond to a lens-barrel with the maximum change in volume, so that a considerably large water-proof or vapor resistant vent has to be provided in the camera body.

Also, in a case where the lens-barrel is provided with a water-proof vent, the appearance/aesthetics of the lens barrel may be impaired.

When a lens-barrel having large changes in volume is rapidly operated, air comes in and out through a sealing part, so that abnormal noise may be produced.

In a structure where a water-proof vent is exposed to the exterior, and a user may, under normal picture taking conditions, inadvertently touch the water-repellent microporous member while operating the camera or lens-barrel, which may result in damage to the water-repellent microstructure, such as peeling-off, or other flaws, or may result in damage in the repellency character of the water-repellent microporous member due to oil or other contaminants carried by user's finger(s).

Also, in an arrangement in which a vent is externally exposed, as disclosed in Japanese Patent Laid-Open No.9-197527 and Japanese Patent Laid-Open No.11-190881, if water droplets cover almost the entire surface of the vent, the air volume required to be passed therethrough cannot be sufficiently maintained, whereby water/vapor may be freed to enter the interior by a vacuum pumping action. Once a droplet/vapor passes thorough the water-repellent microporous member, the water-repellent effect is extremely reduced.

SUMMARY OF THE INVENTION

It is an object of the present invention to provide a lens-barrel that moves in an optical axis direction so as to change the overall length of the lens barrel and yet is water and drip-proof (vapor-repellent) without sacrificing appearance.

In order to achieve the above-mentioned object, a lens apparatus according to a first embodiment of the present invention comprises a lens holding member that holds one of a lens and a lens group, a moving member that holds and moves the lens holding member in an optical axis direction, the moving member having a vent that provides ventilation between the interior and the exterior of the lens apparatus, a water-repellent microporous member that covers the vent, and an appearance member disposed on the moving member, with a clearance provided between the appearance member and the moving member, so as to shield the water-repellent microporous member.

In a lens apparatus according to the first embodiment, the vent may be formed on the external periphery of the moving member.

In a lens apparatus according to the first embodiment, the clearance may provide an opening in a direction opposite an object side in the optical axis direction.

In a lens apparatus according to the first embodiment, the appearance member may be a member that attaches an optical filter in front of one of the lens and the lens group.

In a lens apparatus according to the first embodiment, the vent may be a cam hole for adjusting a position of the lens holding member in the optical axis direction relative to the moving member.

In a lens apparatus according to the first embodiment, the vent may be a hole used for fixing the lens holding member to the moving member.

In a lens apparatus according to the first embodiment, a plurality of vents may be formed on the external periphery of the moving member along a circumferential direction.

A lens apparatus according to the first embodiment further may comprise a fixed member that supports the moving member for movement in the optical axis direction and a sliding member disposed between the moving member and the fixed member that closes up a clearance between the moving member and the fixed member, wherein the sliding member slides relative to the fixed member so as to allow the moving member to be displaced in the direction perpendicular to the optical axis direction during movement of the moving member in the optical axis direction.

A lens apparatus according to a second embodiment comprises a holding member that holds and moves one of a lens and a lens group in an optical axis direction, the holding member having a vent that provides ventilation between the interior and the exterior of the lens apparatus; a water-repellent microporous member that covers the vent; and an appearance member disposed on the holding member, with a clearance provided between the appearance member and the holding member, so as to shield the water-repellent microporous member.

In a lens apparatus according to the second embodiment, the vent may be formed on the face-end surface of the holding member on an object side of the lens apparatus.

In a lens apparatus according to the second embodiment, a plurality of vents may be formed along a circumference on the face-end surface of the holding member on an object side of the lens apparatus.

In a lens apparatus according to the second embodiment, the appearance member may be a ring-shaped member, and the clearance may be provided between the internal periphery of the ring-shaped appearance member and the lens.

A lens apparatus according to the second embodiment further may comprise a fixed member that supports the holding member for movement in the optical axis direction, and a sliding member disposed between the holding member and the fixed member that closes up a clearance between the holding member and the fixed member, wherein the sliding member slides relative to the fixed member so as to allow the holding member to be displaced in the direction perpendicular to the optical axis direction during movement of the holding member in the optical axis direction.

An optical instrument that obtains image information via a lens apparatus according to a third embodiment of the present invention comprises a lens holding member that holds one of a lens and a lens group; a moving member that holds and moves the lens holding member in an optical axis direction, the moving member having a vent that provides ventilation between the interior and the exterior of the lens apparatus; a water-repellent microporous member that covers the vent; and an appearance member disposed on the moving member, with a clearance provided between the appearance member and the moving member, so as to shield the water-repellent microporous member.

An optical instrument for obtaining image information via a lens apparatus according to a fourth embodiment of the present invention comprises a holding member that holds and moves one of a lens and a lens group in an optical axis direction, the holding member having a vent that provides ventilation between the interior and the exterior of the lens apparatus; a water-repellent microporous member that covers the vent hole; and an appearance member disposed in the holding member, with a clearance provided between the appearance member and the holding member, so as to shield the water-repellent microporous member.

Further objects, features and advantages of the present invention will become apparent from the following description of the preferred embodiments with reference to the attached drawings.

DESCRIPTION OF THE PREFERRED EMBODIMENTS (First Embodiment)

FIGS. 1 to 11 show an arrangement of an interchangeable zoom lens-barrel (lens apparatus) for a single lens reflex camera according to a first embodiment of the present invention. This zoom lens-barrel provides water and drip-proof performance characteristics (vapor-resistant characteristics), and is attached to a single lens reflex camera body also having water and drip-proof performance characteristics (vapor-resistant characteristics) so as to constitute an optical instrument that is a camera system with excellent water and drip-proof performance (vapor-resistant characteristics). In addition, the optical instrument may also be an integrated camera of a lens apparatus and a camera body.

Figure 1:
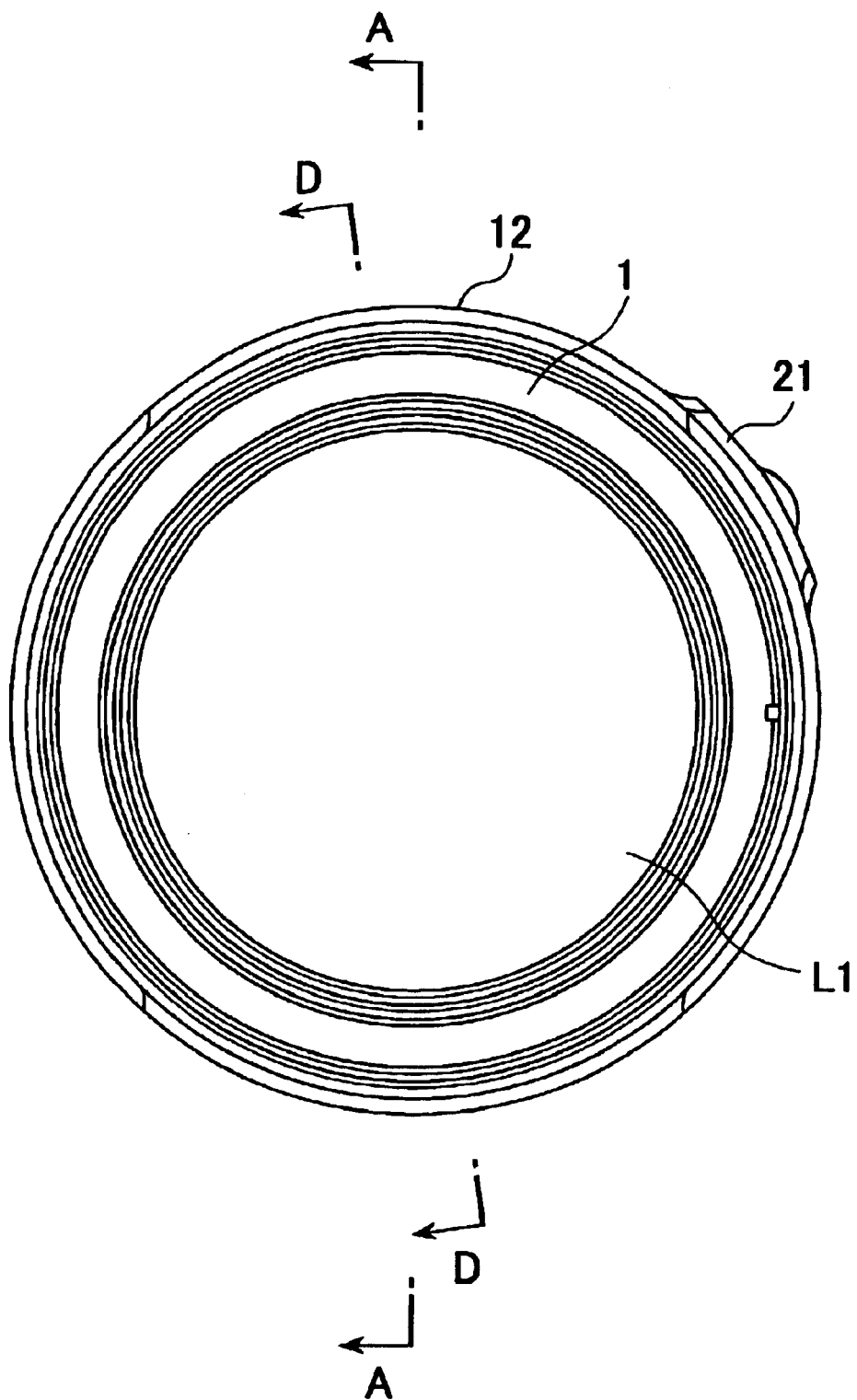
FIG. 1 is a drawing of a lens-barrel according to an embodiment of the present invention viewed in the front optical axis direction.
Figure 2:
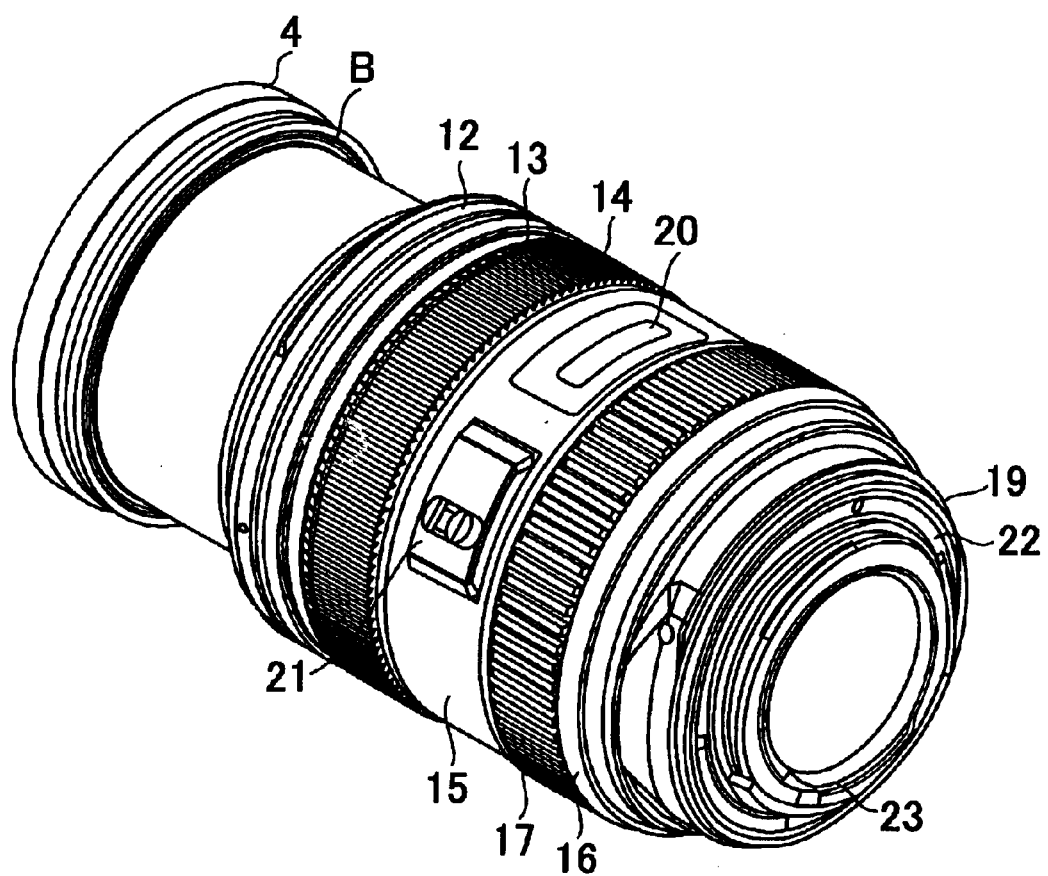
FIG. 2 is a perspective view of the lens-barrel at a wide-angle end.
Figure 3:
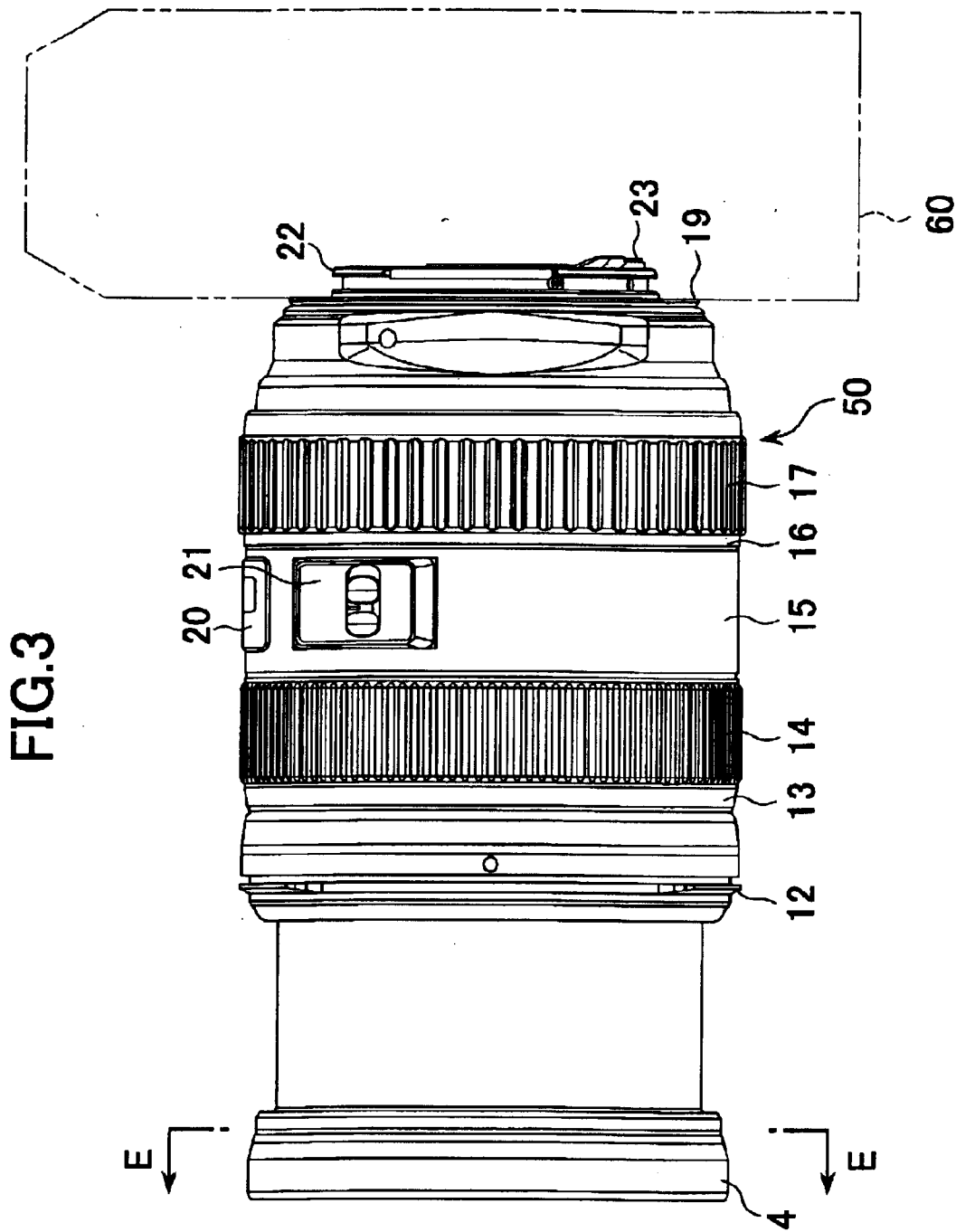
FIG. 3 is a front view of the lens-barrel at the wide-angle end.
Figure 4:
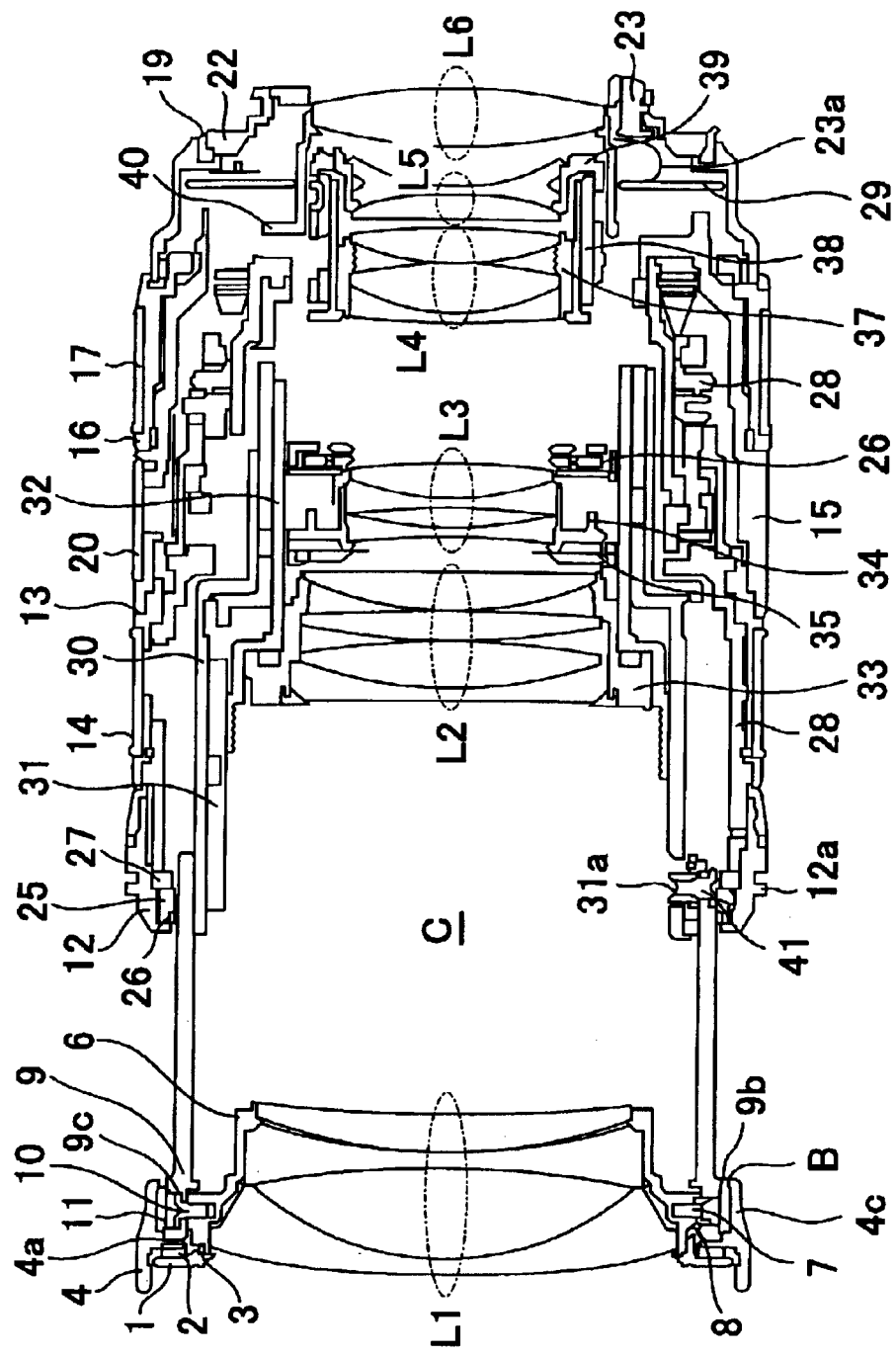
FIG. 4 is a sectional view of the lens-barrel at the wide-angle end and at the line A—A of FIG. 1.
Figure 5:
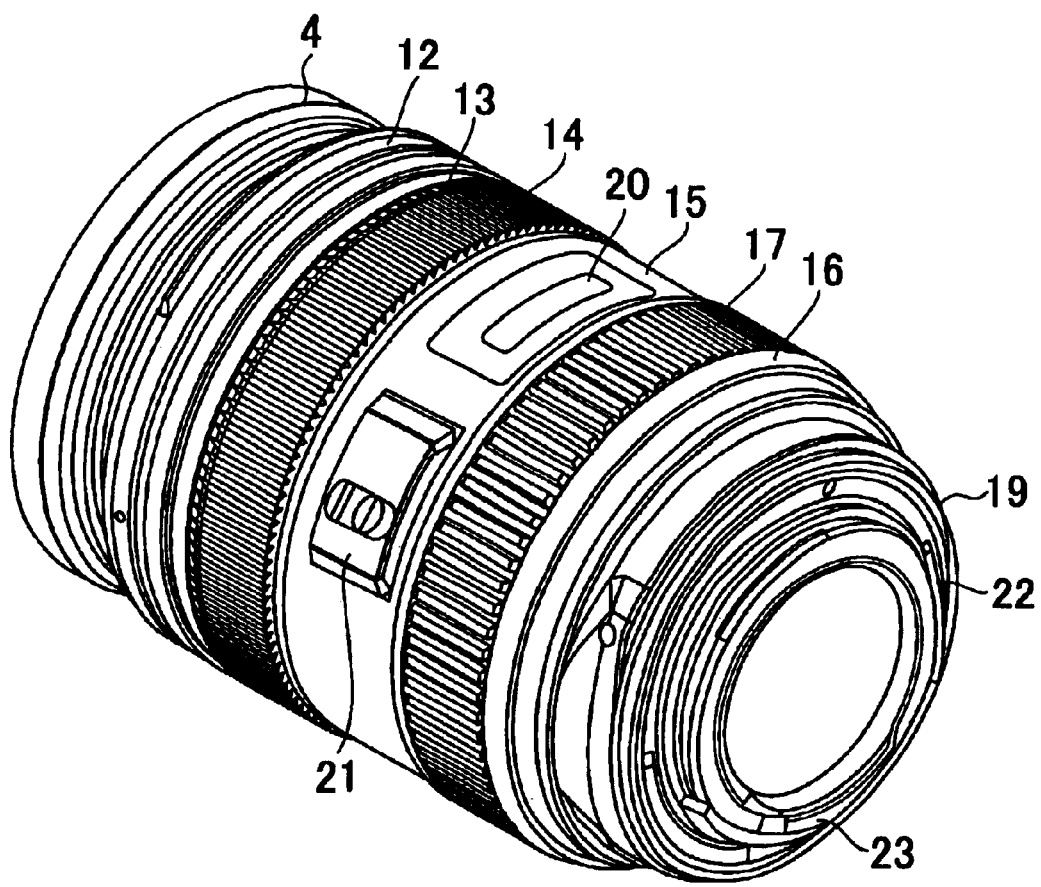
FIG. 5 is a perspective view of the lens-barrel at a telescopic end.
Figure 6:
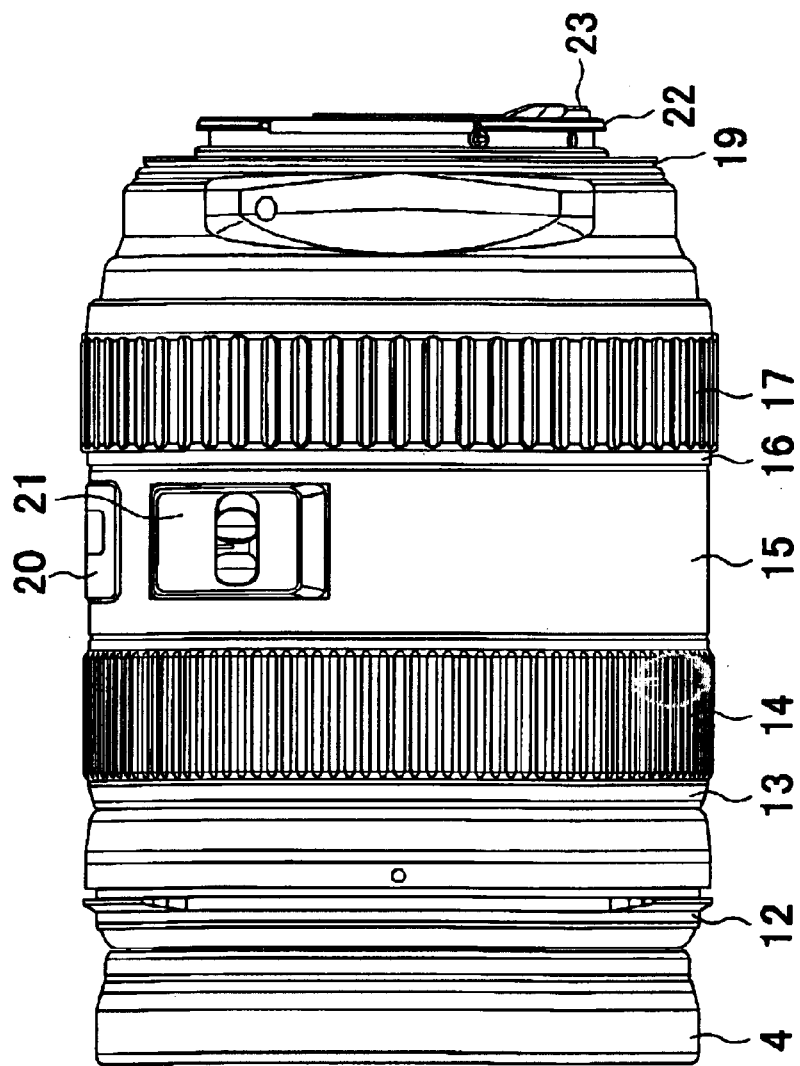
FIG. 6 is a front view of the lens-barrel at the telescopic end.
Figure 7:
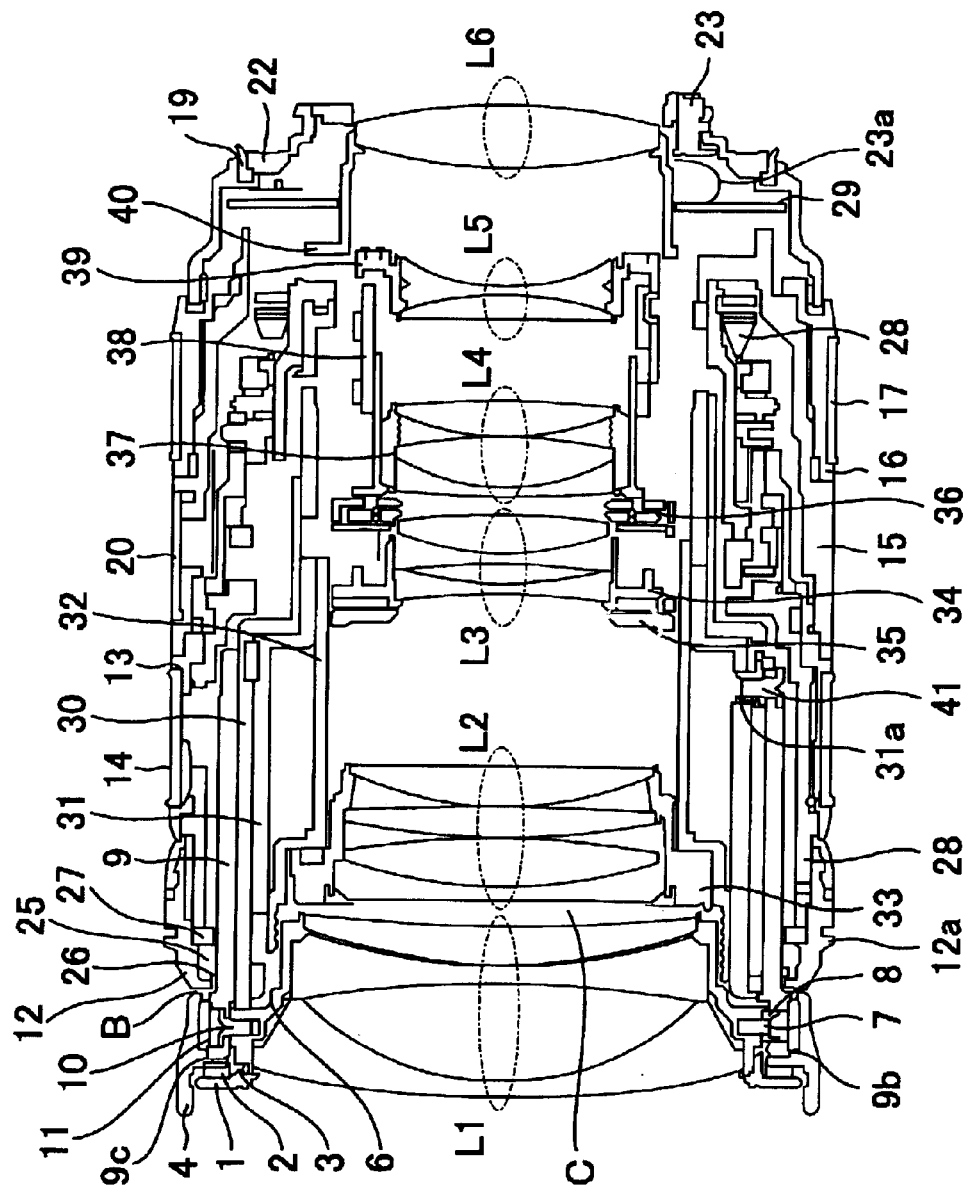
FIG. 7 is a sectional view of the lens-barrel at the telescopic end and at the line A—A of FIG. 1.
Figure 8:
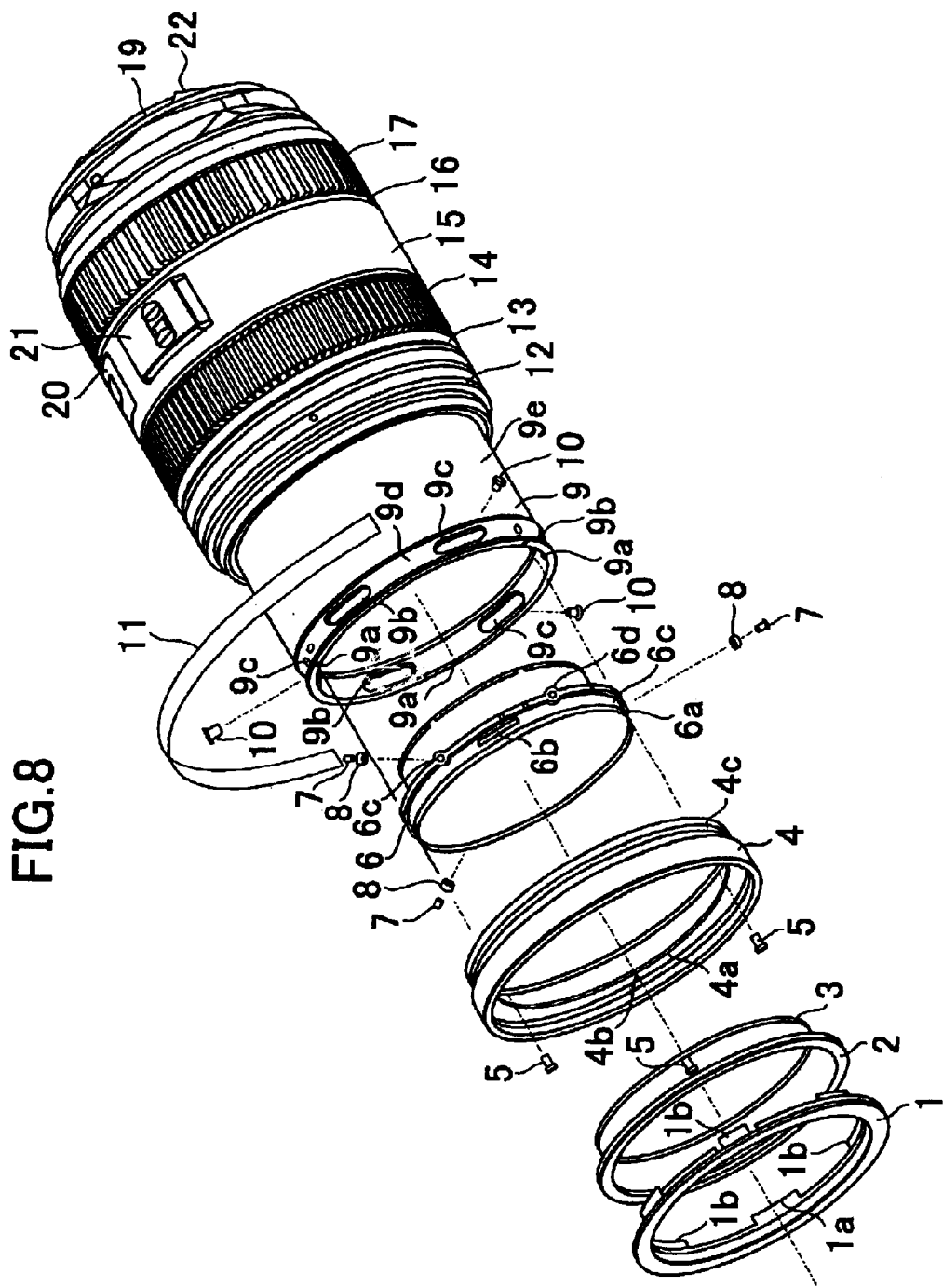
FIG. 8 is an exploded view of a front portion of the lens-barrel.
Figure 9:
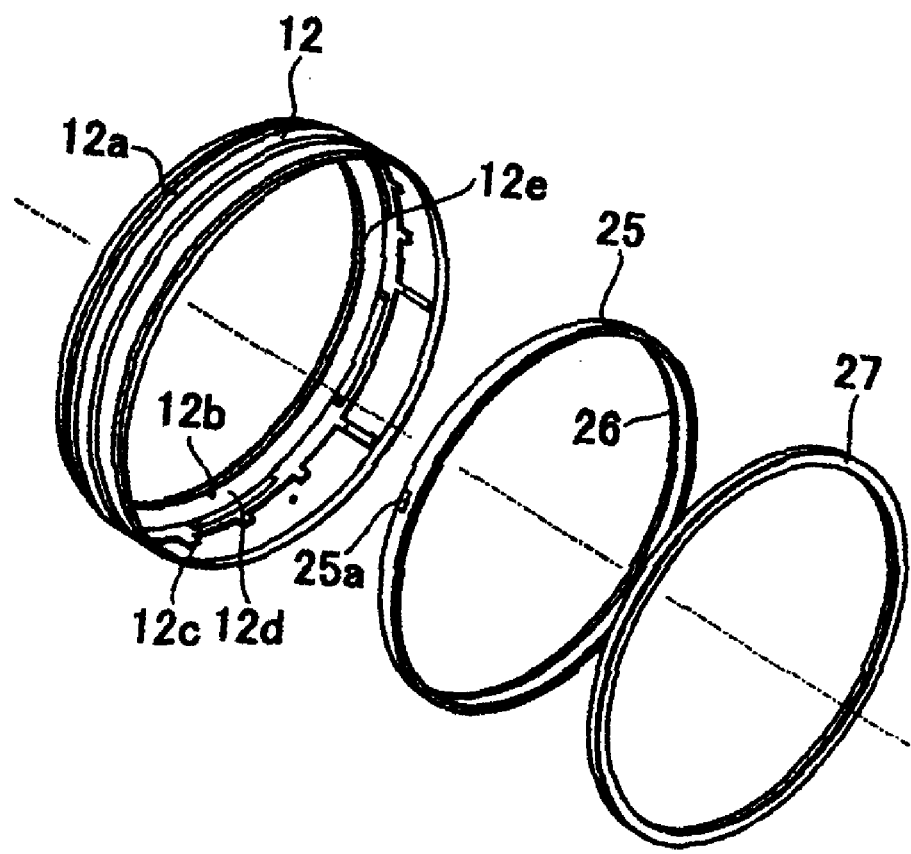
FIG. 9 is an exploded view of the vicinity of a hood-holding ring of the lens-barrel.
Figure 10:
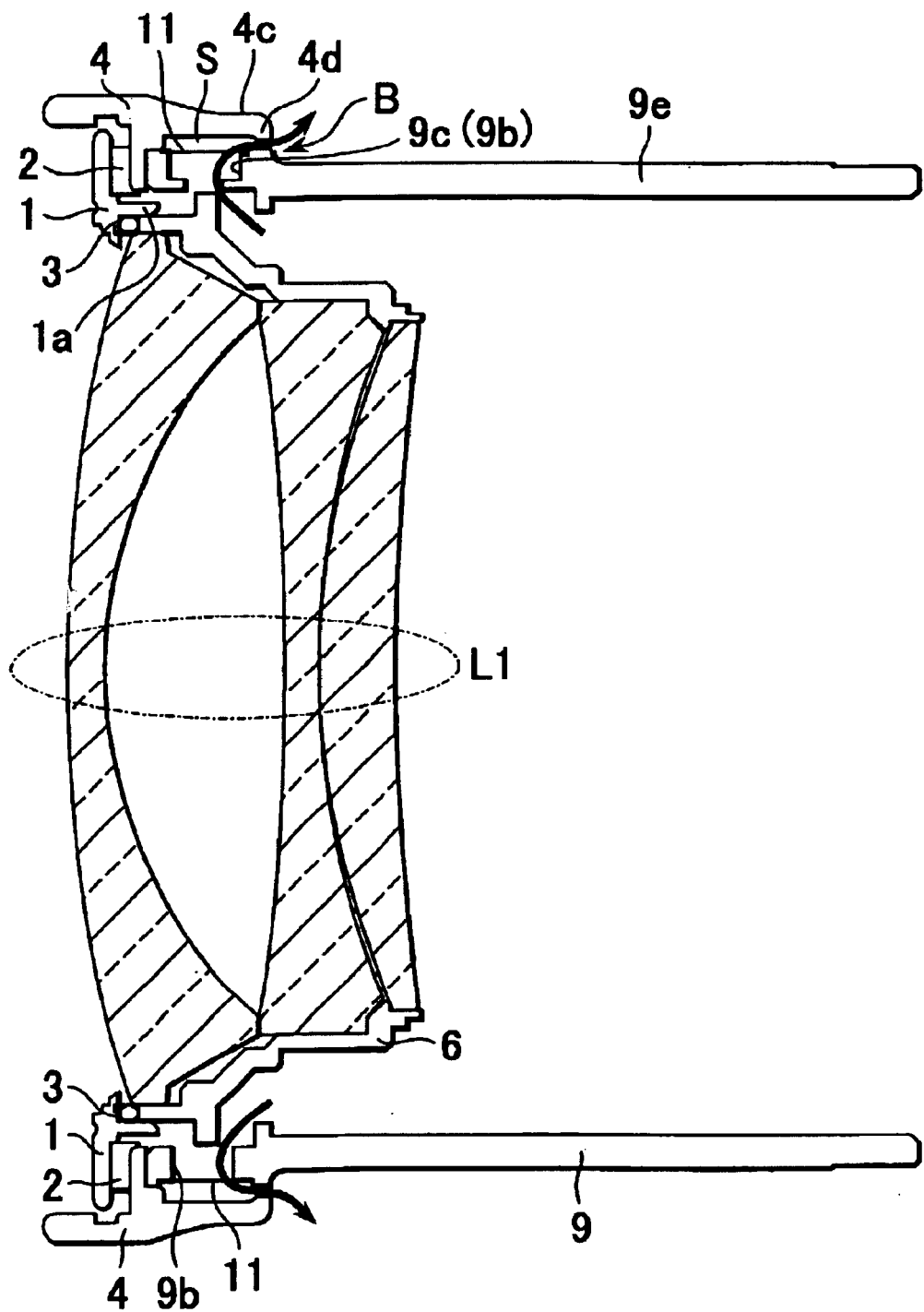
FIG. 10 is a sectional view of the lens-barrel at the line D—D of FIG. 1.
Figure 11:
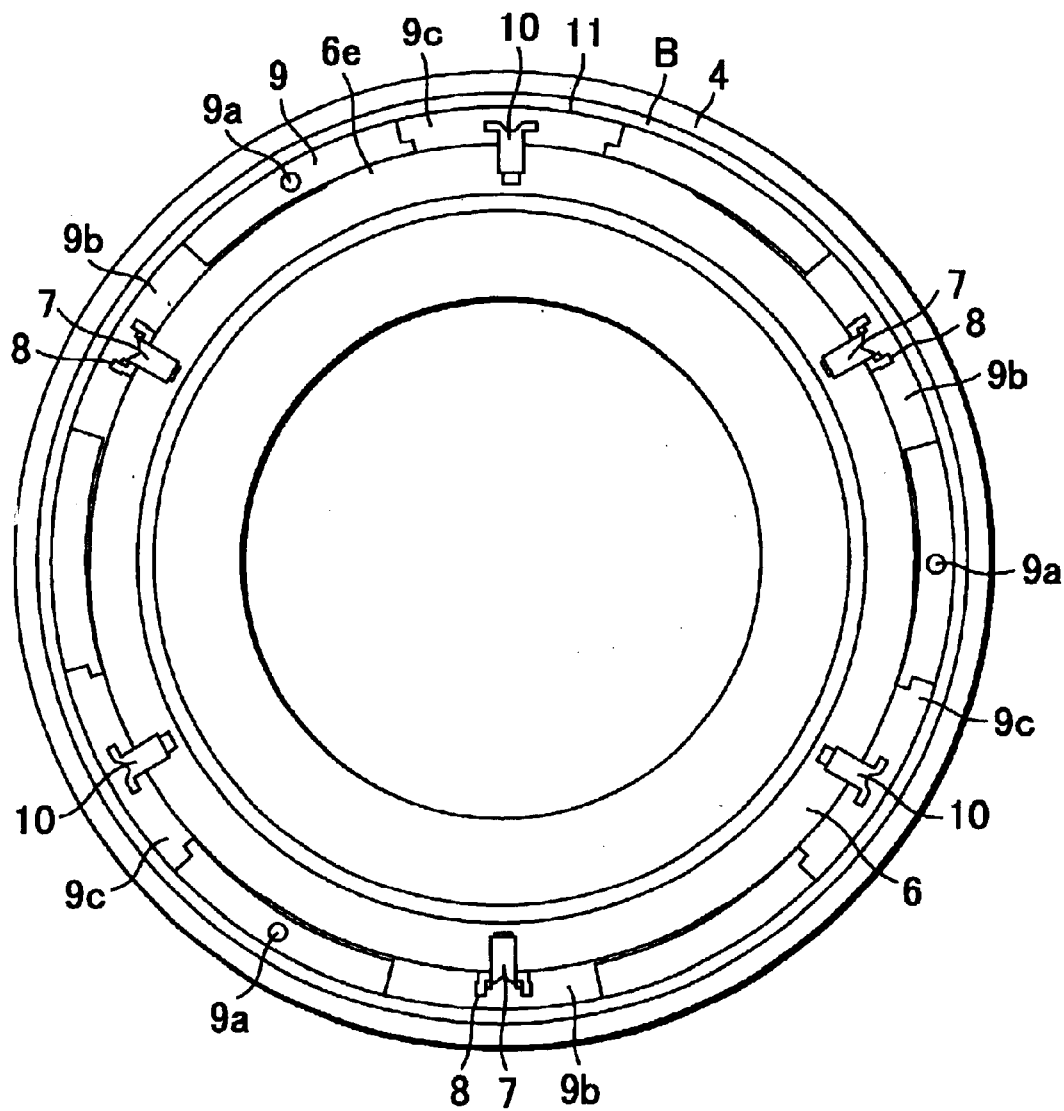
FIG. 11 is a cross-sectional view of the lens-barrel at the line E—E of FIG. 3.

FIG. 1 is a drawing of a zoom lens-barrel according to a first embodiment viewed from a side in front of an optical axis (object side); FIGS. 2 to 4 are drawings showing the zoom lens-barrel at a wide-angle end; and FIGS. 5 to 7 are drawings showing the zoom lens-barrel at a telescopic end. FIGS. 4 and 7 are sectional views taken at the line A—A of FIG. 1, as viewed in the arrow direction, in which only sections are shown. FIGS. 8 and 9 are exploded views of essential parts of the zoom lens-barrel according to the present embodiment. FIG. 10 is a sectional view taken at the line D—D of FIG. 1, as viewed in the, arrow direction; and FIG. 11 is a cross-sectional view taken at the line E—E of FIG. 3, as viewed in the arrow direction.

An arrangement of the zoom lens-barrel will be described with reference to FIGS. 2 to 7. The zoom lens-barrel has a focal-length range of 24 mm to 70 mm and is arranged to change a focal length by rotating a zoom operating ring 16 so as to rotate a cam ring 31.

First to sixth lens groups L1 to L6 are fixed to lens group holding frames 6, 33, 34, 37, 39, and 40, respectively.

The first lens group L1 is fixed to the first lens group holding frame 6, which in turn is integrated with a moving cylinder 9 with screws 10. When a linearly proceeding cam follower 41 fixed to the moving cylinder 9 enters a linearly proceeding groove extending in the optical axis direction and formed in a guide cylinder 30 and a cam groove 31a formed in the cam ring 31 rotating about the optical axis, the moving cylinder 9 is driven so as to move in an optical axis direction. In addition, the first lens group holding frame 6 is constructed so as to be adjustable in position before being fixed to the moving cylinder 9 with the screws 10, the detail of which will be described later.

The second and fourth lens groups L2 and L4 are fixed to the second and fourth lens group holding frames 33 and 37, respectively. Both the second and fourth lens group holding frames 33 and 37 are fixed to a linearly proceeding cylinder 32 with rollers or screws (not shown), and integrally moves in the side in front of the optical axis during changing of the focal length from the wide-angle end to the telescopic end.

The third lens group L3 fixed to the third lens group holding frame 34 moves back and forth between the second and forth groups in the optical axis direction in response to rotation of the cam ring 31. Also, to the third lens group holding frame 34, a diaphragm unit 36 and a sub-diaphragm unit 35 with an aperture diameter changing according to the focal length are fixed.

The fifth lens group L5 is a focusing group, and is fixed to the fifth lens group holding frame 39. The fifth lens group lens holding frame 39 is connected to a vibrating motor unit 28 via a connecting member (not shown), and is rotated about the optical axis by a driving force of the vibrating motor unit 28 during auto-focusing operation while being moved in the optical axis direction by operation of a cam (not shown). In this regard, in FIGS. 4 and 7, although reference numeral 28 points to two different points, in each case numeral 28 denotes a single vibrating motor unit.

The zoom lens-barrel according to the present embodiment is a so-called inner-focus type, in which displacement of the focusing lens group due to a focusing operation is changed in accordance with the focal length, so that changes in the cam region during operation and positional adjustment of the cam in the optical axis direction are performed in accordance with the focal length using a sub-cam-ring 38 which rotates with a change in the focal length. The sub-cam-ring 38 rotates integrally with the cam ring 31. The vibrating motor unit 28 has a known structure and detailed description thereof therefore is omitted.

At the front end of the vibrating motor unit 28, a hood-holding ring 12 is fixed. A hood (not shown) can be held by bayonet connection between a claw 12a of the hood-holding ring 12 and the hood.

The sixth lens group L6 is a fixed lens group, and is fixed to the sixth lens group holding frame 40. The sixth lens group holding frame 40 is connected to a fixing cylinder 15.

As shown in FIG. 3, a mount 22 is provided for connecting the lens-barrel to a single-lens reflex camera body 60, and electrical communication is performed between a terminal block 23 and the camera body 60. A signal from the terminal block 23 is transmitted to a control circuit (not shown) mounted on a principal substrate 29 connected via a flexible printed circuit board 23a so as to control the zooming and focusing operations. Detailed description of the camera body 60 is omitted herein; the camera body 60 is a conventional camera body that obtains image information through a zoom lens-barrel 50, such as a camera using a silver film or a digital camera using an image pick-up element such as a CCD and CMOS.

As shown in FIG. 3, when the zoom lens-barrel 50 is connected to the camera body 60, a rubber seal 19 abuts the camera body 60 so as to provide water and drip-proof performance (vapor-resistance) in the vicinity of the mount 22.

The vibrating motor unit 28, the guide cylinder 30, the fixing cylinder 15, and the mount 22 are referred to as fixing units, and members fixed by these members also constitute the fixing units.

By rotating a focusing ring 13 arranged on the vibrating motor unit 28, focusing can be manually performed. Rubber rings 14 and 17 are provided for improving the operation feeling of the operation units.

Also provided are a graduation window 20, for displaying a distance to an object, and an A/M switch 21, for switching between manual focusing operation using the focusing ring 13 and auto-focusing operation using the vibrating motor unit 28.

Sliding portions of the focusing ring 13 and the A/M switch 21 are provided with sealing rubber, or water and drip-proof oil applied thereto, for providing a water and drip-proof seal.

As is understood from the comparison between FIGS. 4 and 7, the zoom lens-barrel according to the present embodiment is constructed so that the overall length of the lens changes in accordance with a change in the focal length, and the internal volume change is large, particularly in a space C within the zoom lens-barrel. Therefore, it is required to provide a vent in which air can flow in and out of the zoom lens-barrel sufficient to accommodate the volume change of the space C. Also, since a vacuum force for sucking outside air into the zoom lens-barrel is created in the vent by a pumping action due to the volume change, a more intensive water and drip-proof seal/system is needed.

Thus, in the present embodiment, there is provided a vent in the vicinity of the front end of the zoom lens-barrel that permits air to flow in and out sufficient to accommodate the volume change of the space C. The arrangement around the vent will be described below with reference to FIGS. 8 and 10.

In the vicinity of the front end of a peripheral wall 9e of the moving cylinder 9, there are provided three cam grooves (cam holes) 9b and three elongated holes 9c, each having the same lead as that of the cam grooves 9b, for receiving setting screws, and which are formed at substantially equal intervals in the circumferential direction so as to penetrate the peripheral wall 9e. A band portion 9d in the periphery of the peripheral wall 9e of the moving cylinder 9, on which the cam grooves 9b and elongated holes 9c are formed, is formed to have an outer radial diameter slightly smaller than that of other portions of the peripheral wall 9e. In such a manner, in the present embodiment, the cam grooves 9b and elongated holes 9c also serve as vents. Alternatively, a dedicated vent other than the cam grooves 9b and elongated holes 9c may be provided in the peripheral wall 9e.

On the front end-face of the peripheral wall 9e of the moving cylinder 9, three tapped holes 9a are formed in the circumferential direction for fixing a filter frame 4.

Before the first lens group holding frame 6 holding the first lens group L1 is attached to the moving cylinder 9, cam followers 8, which are put through the cam grooves 9b, are fitted in roller seats 6c formed at three positions of the first lens group holding frame 6, and the first lens group holding frame 6 is tentatively fixed by fastening screws 7.

In this state, if the first lens group holding frame 6 is rotated in the circumferential direction of the cam grooves 9b within the width thereof, the position of the first lens group holding frame 6 in the optical axis direction is changed by the lead of the cam, so that optical adjustment can be performed for correcting a focal shift during zooming. Since the cam follower 8 is pressed into the cam groove 9b, the first lens group holding frame 6 cannot move unless a shock is applied thereto.

Next, after the optical adjustment, in order to fix the first lens group holding frame 6, screws 10 are inserted through the elongated holes 9c and tighten into the three tapped holes 6d formed in the first lens group holding frame 6.

Then, on the band portion 9d having the slightly smaller diameter, a water-repellent microporous member 11 having substantially the same width as that of the band portion 9d is bonded. The cam grooves 9b and the elongated holes 9c are thereby covered by the water-repellent microporous member 11. The water-repellent microporous member 11 preferably is made of a material such as Gore-Tex (registered trademark) and Micro-Tex (registered trademark) which allows air to pass through the respective openings while prohibiting water/moisture from passing therethrough.

Thereby, as shown by arrows in FIG. 10, while ventilation is provided between the space C and the space outside the lens-barrel, through the cam grooves 9b and the elongated holes 9c, dust and water droplets (moisture) are prevented from entering the interior of the lens-barrel (the space C) through the cam grooves 9b and the elongated holes 9c.

The water-repellent microporous member 11 is bonded onto the band portion 9d with an adhesive or double-stick tape applied to the fringe surface of the band portion 9d, so that droplets (moisture) can be prevented from coming in between the periphery of the water-repellent microporous member 11 and the band portion 9d. Also, according to the present embodiment, a plurality of the cam grooves 9b and elongated holes 9c are covered with one (a single) water-repellent microporous member 11, so that assembly is easy and cost is decreased in comparison with a case in which plural water-repellent microporous members separately are bonded on each individual cam groove 9b and elongated hole 9c.

Then, the filter frame (appearance member) 4 having a threaded portion formed on the inside surface for fixing a filter is fixed to the moving cylinder 9 by tightening three screws 5 inserted through holes 4b formed in the filter frame 4 into the tapped holes 9a formed in the moving cylinder 9.

A back portion 4c of the filter frame 4 fixed to the moving cylinder 9 covers the external periphery of the water-repellent microporous member 11 so as to provide a space S to accommodate the water-repellent microporous member 11 and having a predetermined length in the direction perpendicular to the optical axis (radial direction). The back end 4d of the filter frame 4 is formed so as to have an internal diameter slightly smaller than the external peripheral diameter of the water-repellent microporous member 11, so that a clearance between the back end 4d and the external periphery of the moving cylinder 9 communicates with the above-mentioned space S so as to define an opening B of the space S.

In such a manner, by arranging the filter frame 4 so as to cover the water-repellent microporous member 11, a user cannot inadvertently touch the water-repellent microporous member 11 (especially portions covering the cam grooves 9b and elongated holes 9c). The opening B opens to the back side, in the optical axis direction, which reduces the possibility that dust and droplets (moisture) may adhere in comparison with a case in which the opening opens to the front side, in the optical axis direction. The clearance of the opening B also is not conspicuously visible from the object side, thereby improving the appearance.

There are a plurality of the cam grooves 9b and elongated holes 9c formed as the vents, so that even if droplets (moisture) is present in the space S via the opening B, so as to cover one of the cam grooves 9b or elongated holes 9c, suction of the droplets (moisture) into the interior of the lens-barrel by a pumping action can be prevented because adequate ventilation is provided by the other cam grooves 9b and elongated holes 9c.

The vicinity of the first lens group L1 in the front of the zoom lens-barrel is also needed to maintain secure water and drip-proof performance. Then, according to the present embodiment, an O ring (sealing member) 3 is sandwiched between a step portion 6a in the front of the first lens group holding frame 6 and a wall 1a extending rearward of a face ring 1 attached in the front of the first lens group holding frame 6 inside the filter frame 4.

Between the face ring 1 and the filter frame 4, an expanded sealant (sealing member) 2 is also sandwiched. The expanded sealant 2 is a member that can maintain the water and drip-proof performance even if it is elastically deformed. After the expanded sealant 2 is bonded on the back side of the face ring 1, the expanded sealant 2 and the O ring 3 are fixed to the face ring 1, while they are compressed, by inserting three claws 1b formed in the face ring 1 into three peripheral grooves 6b formed in the first lens group holding frame 6.

The water and drip-proof performance between the face ring 1 and the filter frame 4 is secured with the expanded sealant 2 and that between the face ring 1 and the first lens group holding frame 6 is secured with the O ring 3. The reason that the expanded sealant 2 is used between the face ring 1 and the filter frame 4, and an O ring is not used therebetween is that a certain degree range of the deformed amount of the expanded sealant 2 can be permitted, since the first lens group holding frame 6 changes the position in the optical axis direction for each lens-barrel by the above-mentioned optical adjustment.

Next, the arrangement of sliding portions in the vicinity of the hood-holding ring 12 will be described with reference to FIG. 9 (also FIGS. 4 and 7).

On the internal periphery of the hood-holding ring 12, a step portion 12d having an internal diameter larger than that of the portion of the ring 12 in the front optical axis direction is formed, and a sliding ring 25 having an external diameter smaller than that of the step portion 12d by a predetermined length is arranged inside the step portion 12d. Owing to the difference between the internal diameter of the step portion 12d and the external diameter of the sliding ring 25, the sliding ring 25 can move inside the hood-holding ring 12 in the direction perpendicular to the optical axis.

A step portion formed on the internal periphery of the front of the sliding ring 25 is provided with a water-repellent felt member 26 bonded therein by a length of one circuit or more. The external surface of the peripheral wall 9e of the moving cylinder 9, which moves in the optical axis direction relative to the fixed part corresponding to changes in the focal length, slides relative to the felt member 26 and the sliding ring 25, which constitute sliding portions. In addition, in a state prior to assembly of the lens-barrel, the internal diameter of the felt member 26 is smaller than the external diameter of the moving cylinder 9. Therefore, after assembly of the lens-barrel, the felt member 26 allows the moving cylinder 9 to slide in a state in which the felt member 26 is pressed into contact with the external periphery of the moving cylinder 9.

The external periphery of a reinforcing ring 27 is pressed into the internal peripheries of pressing projections 12c formed on the internal periphery of the hood-holding ring 12, so that the reinforcing ring 27 is fixed to the hood-holding ring 12. The reinforcing ring 27 also serves to prevent the sliding ring 25 (i.e., the felt member 26) from moving in the optical axis direction.

The external periphery of the sliding ring 25 is provided with three recesses 25a formed thereon, and projections 12b formed on the internal periphery of the hood-holding ring 12 enter the recesses 25a, so that the sliding ring 25 is prevented from rotating. Water and drip-proof oil may be applied between the front end-face of the sliding ring 25 and an end-face 12e formed on the internal periphery of the hood-holding ring 12, opposing the front end-face, and between the back end-face of the sliding ring 25 and the front end-face of the reinforcing ring 27.

By the arrangement described above, even when the moving cylinder 9 extends forward by zooming toward the telescopic end so as to be moved (slanted) in the direction perpendicular to the optical axis relative to the hood-holding ring 12, which is one of plural fixed parts, by the self weight of moving parts including the moving cylinder 9 and the first lens group L1, the sliding ring 25 is shifted in the direction perpendicular to the optical axis relative to the hood-holding ring 12 together with the moving cylinder 9. Therefore, a clearance cannot be produced between the moving cylinder 9 and the sliding ring 25 (felt member 26), preventing water droplets from coming in therethrough.

When the water and drip-proof oil is applied between the front end-face of the sliding ring 25 and the end-face 12e of the hood-holding ring 12, and between the back end-face of the sliding ring 25 and the front end-face of the reinforcing ring 27, as described above, water droplets can also be prevented from coming in therethrough.

Since the sliding ring 25 is prevented from rotating, running-out of oil due to rotation of the sliding ring 25 can be prevented. The felt member 26 is in a slightly crushed state due to the relationship in size between the felt member 26 and the external periphery of the moving cylinder 9 as described above, and the crushed amount changes in accordance with changes in the clearance to the external periphery of the moving cylinder 9, so that a clearance between the felt member 26 and the external periphery of the moving cylinder 9 cannot be produced, enabling the water and drip-proof performance to be maintained.

In such a manner, according to the present embodiment, even when changes in the internal volume of the zoom lens-barrel due to movement of the moving cylinder 9 in the optical axis direction are large, air ventilation can be secured in accordance with changes in the internal volume while the water and drip-proof performance are maintained. Therefore, the internal pressure of the zoom lens-barrel can be maintained substantially equal with the external pressure thereof, enabling the moving cylinder 9 to be smoothly moved during a zooming operation.

In addition, in the present embodiment the cam grooves 9b and elongated holes 9c also serve as vents; alternatively, a case in which a dedicated vent is provided may incorporate the present invention. Also, when a clearance between the sliding ring 25 and the hood-holding ring 12 is filled with an elastic adhesive instead of water and drip-proof oil, the same advantage can be obtained.

The arrangement of the lens-barrel according to the present embodiment is only an example, and the arrangement of a lens apparatus incorporating the present invention is not limited to the present embodiment. That is, the present invention may incorporate a camera system in which an interchangeable lens is combined with a camera, where the interchangeable lens is detachably attached thereto, and an optical instrument such as a camera having a lens integrated with a camera body.

As described above, in the present embodiment the appearance is not impaired by covering the water-repellent microporous member with the appearance member; a user is prevented from inadvertently directly touching the water-repellent microporous member; and, ventilation between the interior of the lens-barrel and the exterior thereof is securely maintained while water and drip-proof performance is maintained. Therefore, the moving cylinder can be smoothly moved.

Also, in the present embodiment, even when the moving cylinder is moved in the direction perpendicular to the optical axis relative to the fixed part, the sealing effect between the moving cylinder and the fixed part can be maintained by moving the sliding member together with the moving cylinder, enabling extremely high water and drip-proof performance to be secured.

(Second Embodiment)

Figure 12:
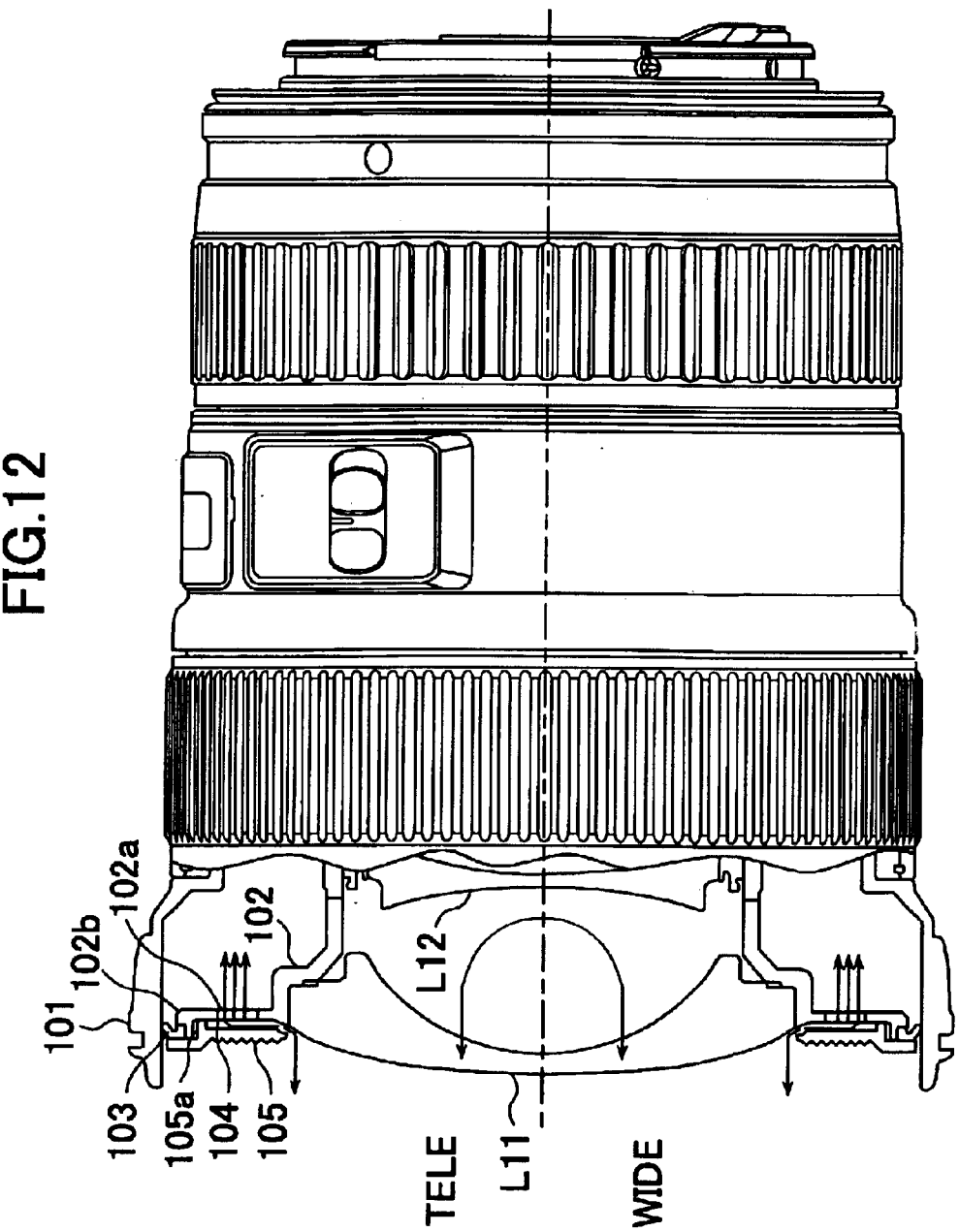
FIG. 12 is a partial sectional view of a lens-barrel according to a second embodiment.
Figure 13:
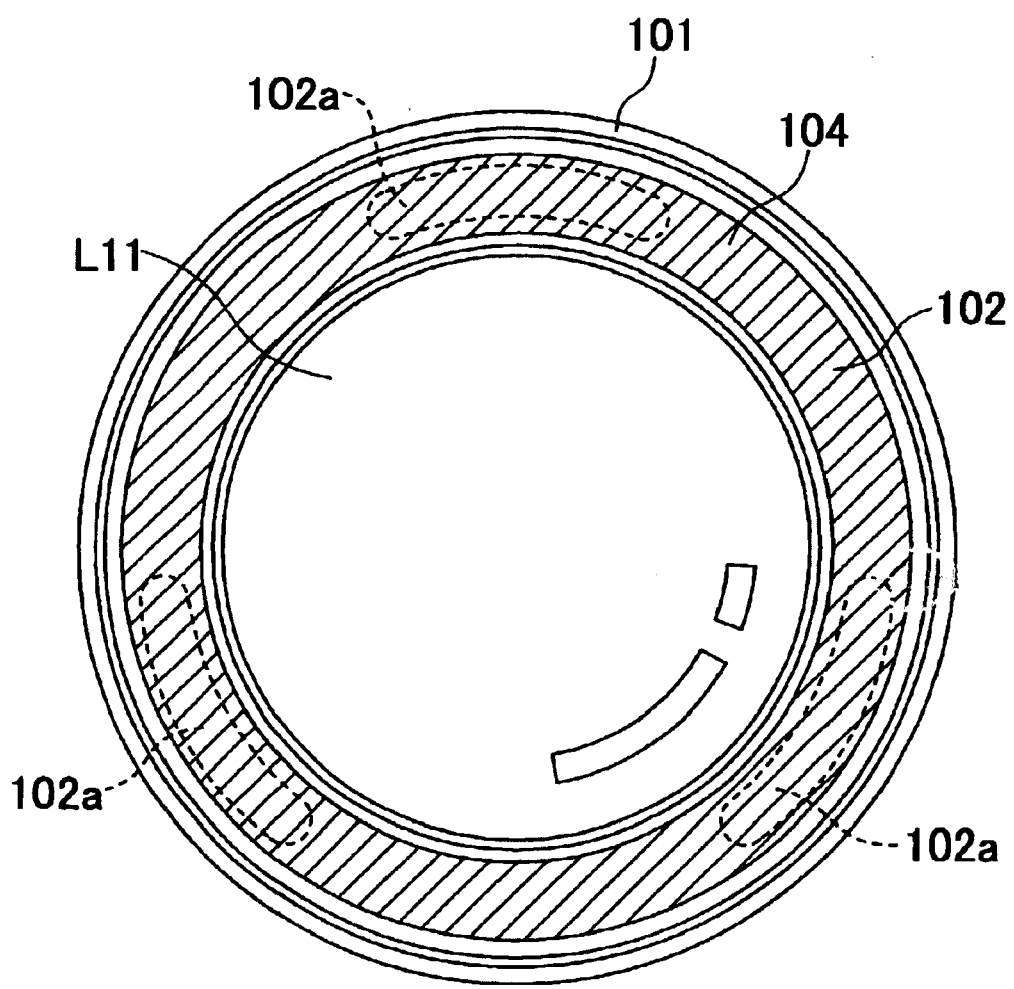
FIG. 13 is a drawing of the lens-barrel shown in FIG. 12 viewed from the front by removing an appearance member.

Next, a second embodiment according to the present invention will be described. FIG. 12 is a partial sectional view of a lens-barrel according to the second embodiment of the present invention, and FIG. 13 is a drawing of the lens-barrel shown in FIG. 12, as viewed from the front by removing an appearance member.

An arrangement of the lens-barrel according to the second embodiment of the present invention will be described with reference to FIGS. 12 and 13. The lens-barrel according to the present embodiment has water and drip-proof performance (vapor-resistant characteristics) and is attached to a single lens reflex camera body also having water and drip-proof performance so as to constitute an optical instrument that is a camera system with excellent water and drip-proof performance. In addition, the optical instrument may also be an integrated camera of a lens apparatus and a camera body.

A first lens L11 moves in an optical axis direction during a zooming operation. The first lens L11 is moved toward an object after first moving toward an image-forming surface corresponding to changes in a focal length from a wide-angle side to a telescopic side. A second lens L12 is disposed on the image-forming surface side of the first lens L11 and moves in the optical axis direction during a zooming or focusing operation.

Numeral 101 denotes a front fixed cylinder of the lens-barrel. A lens-holding frame 102 for holding the first lens L11 engages a driving mechanism (not shown) so as to be moved in the optical axis direction by the driving mechanism during the zooming operation.

On the front surface (an end-face in the object side) of the lens-holding frame 102, a plurality of vent holes 102a are formed so as to provide ventilation necessary to substantially maintain the internal pressure within the lens-barrel equal to the external pressure thereof when a space between the first lens L11 and the second lens L12 is changed so as to change an air volume therein during the zooming operation.

A sealing member 103 is clamped between the lens-holding frame 102 and an appearance member 105 and is fixed thereto. The sealing member 103 is structured so that the external periphery of the sealing member 103 slides while pressing the internal surface of the front fixed cylinder 101 during a time the sealing member 103 moves integrally with the lens-holding frame 102 in the optical axis direction so as to prevent water from coming in from the internal periphery of the front fixed cylinder 101.

A water-repellent microporous member 104 is a member such as Gore-Tex (registered trademark) that allows air to pass therethrough while prohibiting a water droplet (vapor) to pass therethrough. The water-repellent microporous member 104 is bonded and fixed on the front surface of the lens-holding frame 102 by an adhesive method such as a double-stick tape so as to cover the vents 102a formed in the lens-holding frame 102.

The ring-shaped appearance member 105 is fixed on the front surface of the lens-holding frame 102 by screwing a male thread 105a formed in the appearance member 105 into a female thread 102b of the lens-holding frame 102 so that the rear end of the appearance member 105 abuts the front surface of the lens-holding frame 102.

At this time, portions of the appearance member 105 opposing the vents 102a and the water-repellent microporous member 104 covering them have clearances provided therebetween in the optical axis direction. Also, there is provided a clearance between the internal periphery of the appearance member 105 and the side surface of the lens L11 at the object side of the lens.

In the lens-barrel structured as above, although the overall length cannot be changed during a zooming operation, the volume inside the lens-barrel is changed because the space between the lens L11 and the lens L12 is changed from a case in which the lens L11 is positioned at the wide-angle end and a case in which the lens L11 is positioned at the telescopic end to the case that it is positioned at an intermediate point of the focal length of the zooming operation.

In the arrangement as described above, because ventilation caused by the volume changes is sufficiently secured by the vents 102a formed in the lens-holding frame 102 with the water-repellent microporous member 104 therebetween, the clearance provided between the lens-holding frame 102 and the appearance member 105, and the clearance provided between the internal periphery of the appearance member 105 and the side surface of the lens L11 on the object side, the internal pressure within the lens-barrel is maintained substantially equal with the external pressure thereof while sufficiently maintaining the water and drip-proof performance, so that the lens-holding frame 102 can also be smoothly moved during the zooming operation.

(Third Embodiment)

Figure 14:
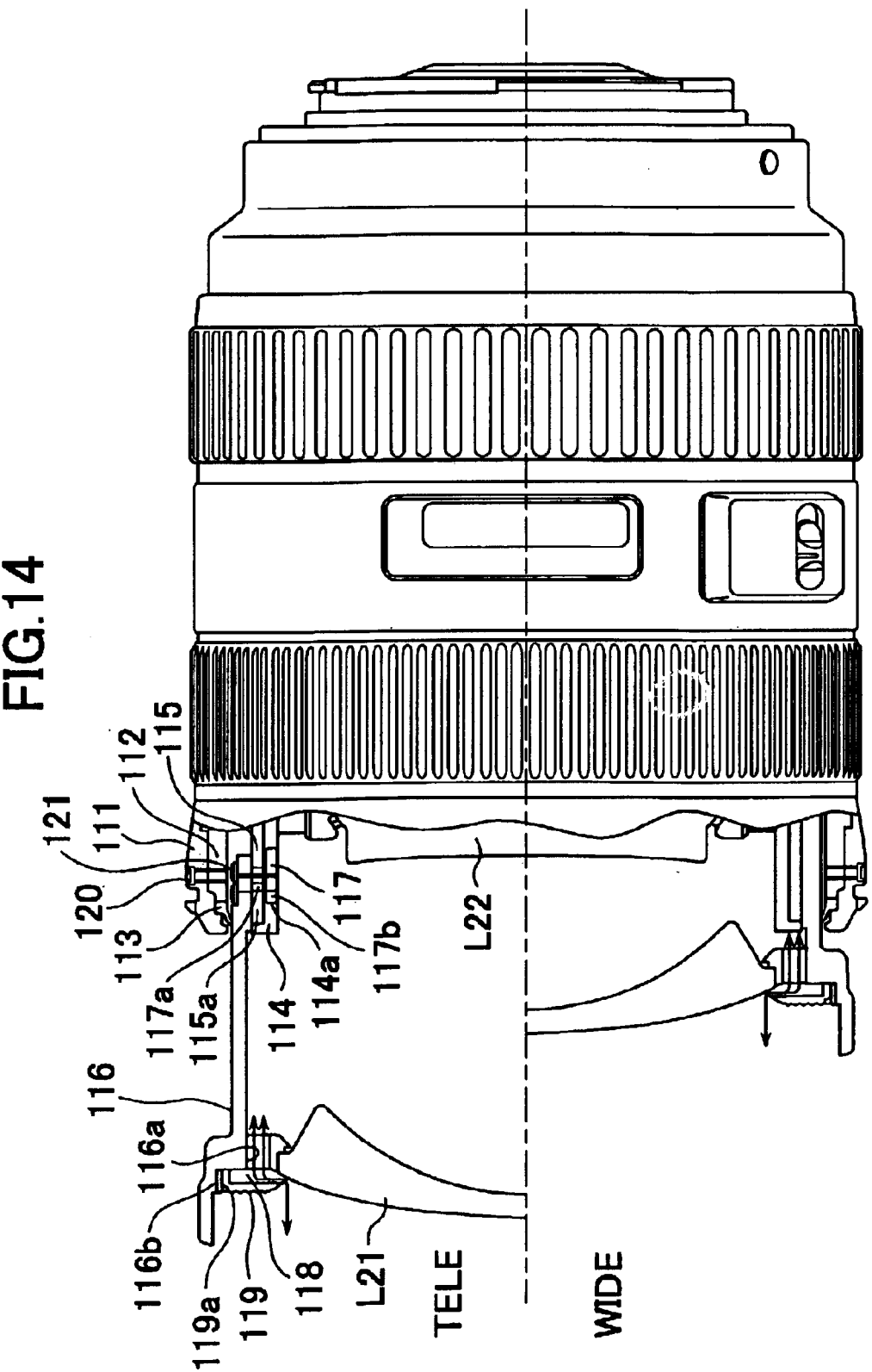
FIG. 14 is a partial sectional view of a lens-barrel according to a third embodiment.
Figure 15:
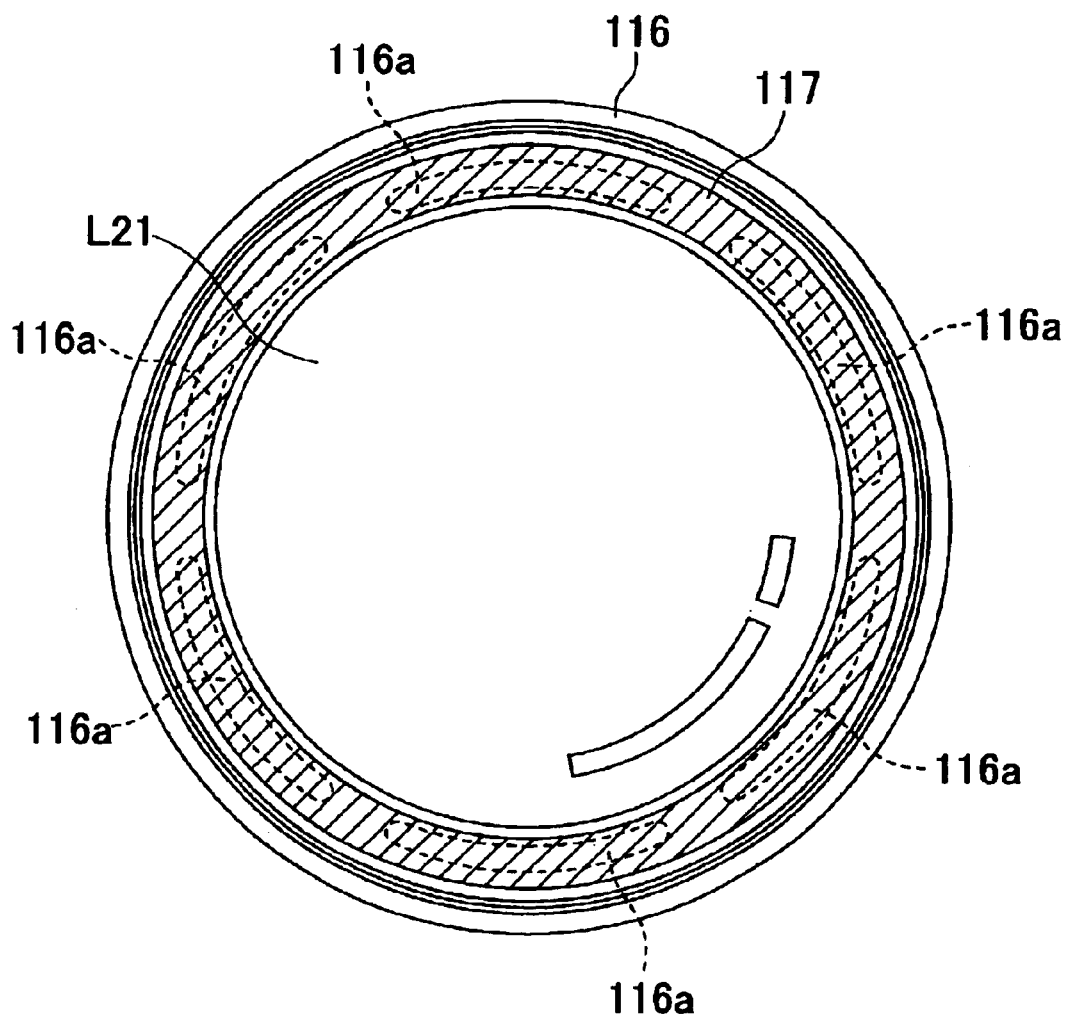
FIG. 15 is a drawing of the lens-barrel shown in FIG. 14 viewed from the front by removing an appearance member.

FIG. 14 is a partial sectional view of a lens-barrel according to a third embodiment of the present invention, and FIG. 15 is a drawing of the lens-barrel shown in FIG. 14 and viewed from the front by removing an appearance member.

An arrangement of the lens-barrel according to the third embodiment of the present invention will be described with reference to FIGS. 14 and 15. The lens-barrel according to the present embodiment has water and drip-proof performance (vapor-repellent characteristics) and is attached to a single lens reflex camera body also having water and drip-proof performance so as to constitute an optical instrument that is a camera system with excellent water and drip-proof performance. In addition, the optical instrument may also be an integrated camera of a lens apparatus and a camera body.

A first lens L21 moves in an optical axis direction during a zooming operation. The first lens L21 is greatly moved toward an object in accordance with changes in a focal length from the wide-angle side to the telescopic side. A second lens L22 is disposed on the image-forming surface side of the first lens L21 and moves in the optical axis direction during a zooming or focusing operation.

Numeral 111 denotes a first front fixed cylinder of the lens-barrel. To a second front fixed cylinder 112 of the lens-barrel, the first front fixed cylinder 111 is fixed with a sealing member 113 clamped therebetween with screws 120.

The sealing member 113 is clamped and fixed between the first front fixed cylinder 111 and the second front fixed cylinder 112. The sealing member 113 is structured so that the sealing member 113 slides in a state in which the internal surface of the sealing member 113 is pressed on the external surface of a lens-holding frame 116. The sealing member 113 prevents water from entering through clearances formed between internal peripheries of the first front fixed cylinder 111 and the second front fixed cylinder 112 and the external periphery of the lens-holding frame 116.

A guiding cylinder 114 is provided with a linear guide groove 114a for linearly guiding the lens-holding frame 116. A cam cylinder 115 is rotated by a driving mechanism (not shown) without being moved in the optical axis direction. The cam cylinder 115 is provided with a cam groove 115a for transmitting a rotation of the cam cylinder 115 to a cam follower 117 so as to move the lens-holding frame 116 in the optical axis direction.

To the lens-holding frame 116 for holding the lens L21, a driving force from a driving mechanism (not shown) is transmitted via the cam cylinder 115, the cam groove 115a, and the cam follower 117, so that the lens-holding frame 116 is moved in the optical axis direction while being guided by the linear guide groove 114a of the guiding cylinder 114 during the zooming operation.

On the front surface (an end-face on the object side) of the lens-holding frame 116, a plurality of vents 116a are formed so as to provide ventilation necessary for substantially maintaining the internal pressure within the lens-barrel equal with the external pressure thereof when a space between the lens L21 and the lens L22 is changed, so as to change an air volume therein during the zooming operation.

The cam follower 117 is provided with a cam follower unit 117a to be engaged with the cam groove 115a of the cam cylinder 115 and a linear key 117b to be engaged with the linear guide groove 114a, which are formed integrally with the cam follower 117. The cam follower 117 is fixed to the lens-holding frame 116 with screws 121.

A water-repellent microporous member 118 is a member such as Gore-Tex (registered trademark) that allows air to pass therethrough while prohibiting a water droplet to pass therethrough. The water-repellent microporous member 118 is bonded and fixed on the front surface (an end-face at the object side) of the lens-holding frame 116 by an adhesive method such as a double-stick tape so as to cover the vents 116a formed in the lens-holding frame 116.

A ring-shaped appearance member 119 is fixed on the front surface of the lens-holding frame 116 by screwing a male thread 119a formed in the appearance member 119 into a female thread 116b formed in the lens-holding frame 116 so that the rear end of the appearance member 119 abuts the front surface of the lens-holding frame 116.

At this time, portions of the appearance member 119 opposing the vents 116a and the water-repellent microporous member 118 covering them have clearances provided therebetween in the optical axis direction. Also, a clearance is provided between the internal periphery of the appearance member 119 and the side surface at the object side of the lens L21.

In the lens-barrel structured as above, the volume inside the lens-barrel changes because the lens-holding frame 116 is largely extended by a zooming operation, whereby the space between the lens L21 and the lens L22 changes.

In the arrangement as described above, because sufficient ventilation occurs during these volume changes through the vents 116a formed in the lens-holding frame 116 and the water-repellent microporous member 118, the clearance provided between the lens-holding frame 116 and the appearance member 119, and the clearance provided between the internal periphery of the appearance member 119 and the side surface of the lens L21 at the object side of the lens L21, the internal pressure within the lens-barrel is maintained substantially equal to the external pressure thereof while sufficiently maintaining a water and drip-proof performance, so that the lens-holding frame 116 can also be smoothly moved during the zooming operation.

According to the third embodiment described above, the sealing member 113 is disposed between the lens-holding frame 116 and the first front fixed cylinder 111; alternatively, between the lens-holding frame 116 and the first front fixed cylinder 111, a sliding member constituted of the sliding ring 25 and the felt member 26, which are described in the first embodiment, may be arranged so as to prevent a water droplet (vapor) from entering via the sliding member.

According to the second and third embodiments described above, the arrangement of the lens-barrel is such that the lens arranged on the utmost object side moves during the zooming operation while the lens arranged on the image-forming surface side of the first lens is moved by a focusing operation; an arrangement of the lens-barrel in which a plurality of lenses are moved by the zooming and focusing operations, so as to change the volume inside the lens-barrel, may incorporate these embodiments so as to have the same advantages.

As described above, according to these embodiments, because there is provided an air-flow path constituted of the vents formed in the lens-holding frame arranged on the utmost object side and the water-repellent microporous member therebetween, clearances provided in the optical axis direction between the appearance member disposed on the object side of the lens-holding frame and the lens-holding frame and the water-repellent microporous member, and the clearance provided between the internal periphery of the appearance member and the lens arranged on the utmost object side, a lens-barrel can be obtained which has an internal pressure adjusting function sufficiently corresponding to the large volume changes due to zooming using the front surface of the lens-barrel, with which a user cannot inadvertently contact directly.

That is, for all the lens-barrels having different volume changes due to zooming, and water and drip-proof performance as well are provided water-proof vents having capacity sufficiently corresponding to the volume changes of each lens-barrel without defects of the water-repellent microporous member, such as peeling-off and flaws with a finger of a user taking a picture, without the internal pressure adjusting function hampered by blocking the vent holes with a finger, or without sacrificing appearance, enabling the internal pressure of the lens-barrel to be maintained substantially equal with the external pressure thereof.

Furthermore, by arranging the water-repellent microporous member outside the vents formed in the lens-holding frame, maintenance of the water-repellent microporous member, such as cleaning and replacing can be easily performed by only removing the appearance member.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lens apparatus comprising:
   a lens holding member that holds one of a lens and a lens group;
   a moving member that holds the lens holding member, said moving member moving in an optical axis direction, said moving member having a plurality of vents that provide ventilation between the interior and the exterior of the lens apparatus, said plurality of vents being formed on the external periphery of said moving member along a circumferential direction thereof;
   a water-repellent microporous member that covers said plurality of vents, said water-repellent microporous member being an air-permeable and water-impermeable member; and
   an appearance member disposed on said moving member, with a clearance provided between said appearance member and said moving member, so as to shield said water-repellent microporous member.

2. A lens apparatus according to claim 1, wherein the clearance opens in a direction opposite an object side in the optical axis direction.

3. A lens apparatus according to claim 1, wherein said appearance member further provides a mount for an optical filter in front of one of the lens and the lens group.

4. A lens apparatus according to claim 1, wherein the vent is a cam hole for adjusting a position of said lens holding member in the optical axis direction relative to said moving member.

5. A lens apparatus according to claim 1, wherein the vent is a hole for fixing said lens holding member to said moving member.

6. A lens apparatus according to claim 1, further comprising:
   a fixed member that supports said moving member for movement in the optical axis direction; and
   a sliding member disposed between said moving member and said fixed member that closes up a clearance formed between said moving member and said fixed member,
   wherein said sliding member slides relative to said fixed member so as to allow said moving member to be displaced in the direction perpendicular to the optical axis direction during movement of said moving member in the optical axis direction.

7. A lens apparatus comprising:
   a holding member that holds one of a lens and a lens group, said holding member moving in an optical axis direction and said holding member having a plurality of vents that provide ventilation between the interior and the exterior of the lens apparatus, said plurality of vents being formed alone a circumference on an object-side end face surface of said holding member;
   a water-repellent microporous member that covers said plurality of vents, said water-repellent microporous member being an air-permeable and water-impermeable member; and
   an appearance member disposed on said holding member, with a clearance provided between said appearance member and said holding member, so as to shield the water-repellent microporous member.

8. A lens apparatus according to claim 7, wherein said appearance member is a ring-shaped member, and the clearance is provided between the internal periphery of said ring-shaped appearance member and said holding member.

9. A lens apparatus according to claim 7, further comprising:
   a fixed member that supports said holding member for movement in the optical axis direction; and
   a sliding member disposed between said holding member and said fixed member that closes up a clearance between said holding member and said fixed member,
   wherein said sliding member slides relative to said fixed member so as to allow said holding member to be displaced in the direction perpendicular to the optical axis direction during movement of said holding member in the optical axis direction.

10. An optical instrument, including a lens apparatus, for obtaining image information via the lens apparatus, said optical instrument comprising:
   a lens holding member that holds one of a lens and a lens group;
   a moving member that holds the lens holding member, said moving member moving in an optical axis direction and said moving member having a plurality of vents that provide ventilation between the interior and the exterior of the lens apparatus, said plurality of vents being formed on the external periphery of said moving member along a circumferential direction thereof;

a water-repellent microporous member that covers said plurality of vents, said water-repellent microporous member being an air-permeable and water-impermeable member; and an appearance member disposed on said moving member, with a clearance provided between said appearance member and said moving member, so as to shield said water-repellent microporous member.

11. An optical instrument, including a lens apparatus, for obtaining image information via the lens apparatus, said optical instrument comprising;

a holding member that holds one of a lens and a lens group of the lens apparatus, said holding member moving in an optical axis direction and said holding member having a plurality of vents that provide ventilation between the interior and the exterior of said lens apparatus, said plurality of vents being formed along a circumference on an object-side end face surface of said holding member;

a water-repellent microporous member that covers said plurality of vents, said water-repellent microporous member being an air-permeable and water-impermeable member; and an appearance member disposed on said holding member, with a clearance provided between said appearance member and said holding member, so as to shield said water-repellent microporous member.

12. An optical instrument, including a lens apparatus, for obtaining image information via the lens apparatus, said optical instrument comprising:

a holding member that holds one of a lens and a lens group, said holding member moving in an optical axis direction, said holding member having a plurality of vents that provides ventilation between the interior and the exterior of the lens apparatus, said plurality of vents being formed on the external periphery of said holding member along a circumferential direction thereof;

a water-repellent microporous member that covers said plurality of vents, said water-repellent microporous member being an air-permeable and water-impermeable member; and an appearance member disposed on said holding member, with a clearance provided between said appearance member and said holding member, so as to shield the water-repellent microporous member.

* * * * *

UNITED STATES PATENT AND TRADEMARK OFFICE
CERTIFICATE OF CORRECTION

PATENT NO. : 6,738,570 B2   Page 1 of 1
DATED : May 18, 2004
INVENTOR(S) : Mitsuru Shinohara et al.

It is certified that error appears in the above-identified patent and that said Letters Patent is hereby corrected as shown below:

Column 1,
Line 36, "prohibit" should read -- prohibiting --.

Column 4,
Line 39, "the," should read -- the --.
Line 65, "moves" should read -- move --.

Column 14,
Line 33, "alone" should read -- along --.

Signed and Sealed this

Sixteenth Day of November, 2004

JON W. DUDAS
*Director of the United States Patent and Trademark Office*